2,957,021
NITRATE ESTERS OF AMINO ALCOHOLS AND SALTS THEREOF

John C. Krantz, Jr., Ruxton, and Raymond M. Burgison, Catonsville, Md., assignors to The Chattanooga Medicine Company, Chattanooga, Tenn., a corporation of Tennessee No Drawing. Filed Jan. 20, 1959, Ser. No. 787,834

5 Claims. (Cl. 260—467)

The instant invention relates to new chemical compounds, and more particularly, to new nitrated tetra-alkanoldiamines and salts thereof, and the preparation thereof.

Although the instant compounds have uses in a number of fields, they have been found to have unusual therapeutic properties. These compounds are useful as coronary dilators in angina pectoris and post-coronary conditions.

The instant compounds include nitrated tetraalkanoldiamines and salts formed of an acid and such nitrated tetraalkanoldiamines.

It is, therefore, an important object of the instant invention to provide novel nitrated tetraalkanoldiamine compounds and salts thereof, and to provide a method for the preparation thereof.

It is another object of the instant invention to provide a novel compound which is a tetra-N,N,N',N'-(2-hydroxyethyl)ethylene diamine tetranitrate, and novel salts formed therefrom.

Other and further objects, features and advantages of the present invention will become apparent to those skilled in the art from the following detailed description thereof.

The instant invention consists in a compound having the formula:

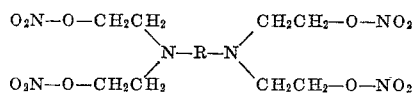

wherein R is a $C_2$–$C_6$ hydrocarbon group. The radical R may thus be ethylene, propylene (e.g. trimethylene), butylene (e.g. tetramethylene), amylene (e.g. pentamethylene), hexylene (e.g. hexamethylene), cyclopentylene or cyclohexylene, including branched and straight chain hydrocarbon groups. The preferred compound of the invention is tetra-N,N,N',N'-(2-hydroxyethyl)ethylenediamine-tetranitrate; wherein R is ethylene $$(-CH_2CH_2-)$$

R is preferably a non-aromatic saturated hydrocarbon radical.

The starting material used in the preparation of the compounds of the invention is a diamine having the formula $H_2N-R-NH_2$, wherein R has the definition previously mentioned. Such diamines include ethylene diamine, propylene diamine, trimethylene diamine, butylene diamine, tetramethylene diamine (i.e. putrescine), amylene diamine, pentamethylene diamine (i.e. cadaverine), hexylene diamine, hexamethylene diamine, cyclopentylene diamine, cyclohexylene diamine, etc.

The initial reaction carried out is between the diamine and ethylene or propylene oxide in order to form the corresponding tetra-N,N,N',N'-(2-hydroxyalkyl) diamine, in accordance with the following Equation 1:

(1)
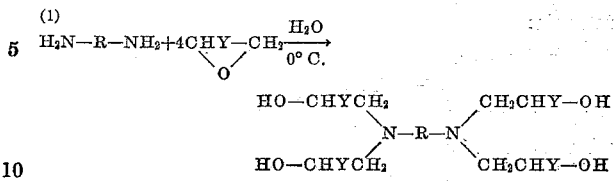

wherein Y is $CH_3$ or H.

As indicated, the reaction of Equation 1 is carried out in the presence of water at a low temperature of about 0° C. The reaction may be carried out at a temperature ranging from about 20° C. to the lowest temperature at which the reaction mixture remains liquid, but the preferred temperature is 0° C. In carrying out the reaction, a charge of 1 mol of the diamine (ethylene diamine), 10 mols of water, and 4 mols of $C_2$ or $C_3$ alkylene oxide is fed into a reaction vessel maintained in an ice bath. The alkylene oxide is fed in slowly so as to maintain the reaction temperature at about 0° C. After the alkylene oxide has been fed in, the reaction mixture is allowed to warm up slowly to room temperature and vacuum is applied to remove most of the water. Distillation for water removal at elevated temperature may lead to decomposition of the product. After as much water as possible has been removed by the vacuum, the product is dried by exposure to a hygroscopic material (phosphorus pentoxide). The material is placed in a shallow dish over the phosphorous pentoxide in a vessel closed to ambient atmosphere, and the resulting dry product is a syrup of rather thick consistency.

Example 1

In preparing the tetra-N,N,N'N'-(2-hydroxyethyl) ethylenediamine-tetranitrate, the dried tetra-N,N,N',N'-(2-hydroxyethyl) ethylenediamine just prepared is introduced slowly into a reaction vessel containing red-fuming nitric acid (sp. gr. 1.60) with stirring. A reaction vessel is maintained in an ice salt bath so as to maintain the nitrating acid at −10° C. to 10° C. (i.e. actually held at 0° C. which is the preferred upper limit for the reaction temperature). The ratio of dried tetra-N,N,N',N'-(2-hydroxyethyl) ethylenediamine to red-fuming nitric acid used is 5 grams per 35 cc. of the nitrating acid. As just indicated, during the drying procedure the tetra-N,N,N',N'-(2-hydroxyethyl) ethylenediamine may reach temperatures as high as about 30° C., although drying is preferably carried out at approximately room temperature. Such drying may be carried out at temperatures as low as about 10° C. In the nitrating process, however, the temperature is maintained preferably in the range of −10° C. to 10° C.

It should be noted that the same result in smaller yield is obtained using fuming nitric acid (sp. gr. 1.5) in place of the red-fuming nitric acid.

When all of the diamine has been added to the acid, the mixture is allowed to stand at −10° to 0° for ½ hour and then the reaction mixture is quickly poured into 400 cc. of crushed ice (on the basis of 400 cc. of ice for each 35 cc. of red-fuming nitric acid used in carrying out the nitrating step). A blue solution results. This solution is made alkaline by the slow addition of ammonia water and a material having the appearance of a white gum or thick oil separates. While this mixture is still cold it is extracted with 3 portions of ether (about 200 cc. each), and the resulting ether solution is dried over anhydrous sodium sulfate. The ether may, of course, be removed by low temperature evaporation to yield tetra-N,N,N',N'-(2-hydroxyethyl) ethylenediamine-tetranitrate (free base).

In this instance the phosphate salt is prepared by the addition of 2 mols of phosphoric acid for each mol of the tetranitrate in the dry ether solution, which is still maintained at 0° C. to 10° C., and the phosphate salt precipitates. It is found that the phosphate salt contains 24 weight percent $H_3PO_4$ which is a compound having the formula:

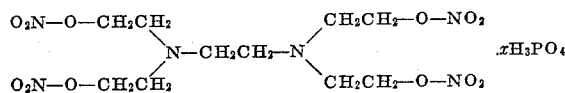

wherein $x$ is 1.3.

If the nitrate salt is desired, a simplified procedure is to permit the material poured into the 400 cc. of crushed ice (without subsequent addition of ammonia) to stand for at least ½ hour, and a colorless crystalline material precipitates. This material as the following formula:

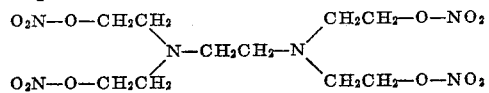

Empirical values: C=22.42, H=4.45, N=20.36; and calculated values C=22.14, H=4.09, N=20.66.

The same procedure as that just described may be used to produce other compounds of the invention, by substituting for the ethylenediamine such diamines as trimethylene diamine, tetramethylene diamine, pentamethylene diamine, hexamethylene diamine, cyclopentylene diamine, cyclohexylene diamine, or the like. In each case the procedure employed is the same as that here described with respect to process steps and a resulting phosphate salt is obtained. These compounds are mildly explosive (percussion test) but they ignite instantly if touched by a flame.

Also, other salts of the invention are prepared by substituting other acids for the phosphoric acid in the procedure just described. For example, hydrochloric, hydrobromic, nitric, sulfuric, acetic or citric acids may be used to obtain the corresponding salts by the addition of such acids in place of the phosphoric acid to the cold dry ether solution of the tetra-N,N,N',N'-(2-hydroxyethyl) diamine.

The tetranitrate (free base) is very soluble in methanol. Water can be removed from this solution by allowing it to stand over burnt lime (calcium oxide) for 24 hours at 0°. Upon adding an acid to the methanol solution of the tetranitrate, followed by dry ether until a precipitate forms, the following colorless salts are precipitated (filter, wash with dry ether; dry over $P_2O_5$ in vacuo):

The nitrate_____ M.P. 93–94°.
The hydrobromide_____ M.P. 125° (decomposition).
The hydrochloride_____ M.P. 117°.
The sulfate_____ Softens at 35°, completely molten at 90°.

All are hygroscopic and very soluble in water (except nitrate—which is stable in air).

Example 2

Preparation of tetra-N,N,N',N'-(2-hydroxyethyl)-1,3-trimethylenediamine tetranitrate:

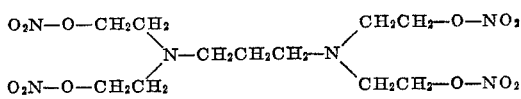

The thick, viscous, brown oil obtained from the reaction of 4 mols of ethylene oxide with 1 mol of 1,3-trimethylenediamine in water as described in the first example, and dried over $P_2O_5$ in vacuo, was nitrated with red-fuming nitric acid in the same way as previously described. On pouring the reaction mixture onto crushed ice, a greenish-yellow oil-gum separated. (This gum "flashed" when touched with a flame, but did not appear to decompose violently on heating to 150° slowly on the melting point block.) Ammonia water was added slowly to the reaction mixture (maintaining an excess of ice) with stirring until all green color disappeared and the gum turned tan. This gum was almost insoluble in cold ether, but very soluble in methyl alcohol at room temperature.

The tetranitrate precipitates from the methanol solution by the addition of water (as an oil). After washing several times with ice water, the gummy residue was dissolved in 50 ml. of methanol and the methanol solution allowed to stand over calcuim oxide at 0° for 24 hours (to remove water).

Upon adding syrupy phosphoric acid (85%) to the methanol solution, followed by dry ether until a voluminous colorless precipitate formed, the phosphate of tetra-N,N,N',N'-(2'-hydroxyethyl)-1,3-trimethylenediamine tetranitrate was obtained in good yield, filtered and dried in vacuo over $P_2O_5$. Melting point at 95° (with yellowing). The material is hygroscopic.

Example 3

Preparation of N,N,N',N'-tetra-(2'-hydroxyethyl)-1,4-tetramethylenediamine tetranitrate:

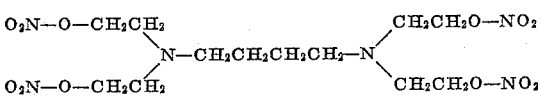

The thick, brown oil resulting from the reaction of 4 mols of ethylene oxide with 1,4-tetramethylenediamine (i.e., "putrescine" or 1,4-diaminobutane) in water, followed by removal of water (as described in the first example) was nitrated as previously described. After pouring into ice (a blue-green gummy oil was obtained) and cautiously neutralizing the gum with ammonia water in the presence of ice, a tan oily residue was obtained and washed with ice water and dissolved in methanol as previously described. The dried methanol solution (over CaO) was then saturated with dry hydrogen chloride and then diluted with dry either until a voluminous colorless precipitate of the hydrochloride separates. The hydrochloride salt of tetra-N,N,N',N'-(2'-hydroxyethyl)-1,4-tetramethylenediamine tetranitrate, is a colorless micro-crystalline salt, very soluble in water and hygroscopic, melting at 110–112° C.

Example 4

Preparation of tetra-N,N,N',N'-(2'-hydroxyethyl)1,5-pentamethylenediamine tetranitrate:

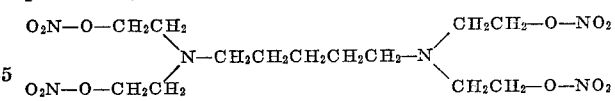

The brown product (i.e. tetra-N,N,N'.N'-(2'-hydroxyethyl)-1,5-pentamethylenediamine) resulting from the reaction of 4 mols of ethylene oxide with 1 mol of 1,5-pentamethylenediamine (i.e., "cadaverine" or 1,5-pentanediamine) in ice water, and subsequently dried as described in the first example, was nitrated in the manner previously described. Upon pouring the reaction mixture onto ice, a blue gummy oil separated, which, upon cautious neutralization with ammonia water in the presence of ice, was obtained as a light tan gum. It was dissolved in methyl alcohol and dried over calcium oxide as previously described, and converted into the phosphate by adding syrupy $H_3PO_4$ followed by dry ether. The phosphate of tetra-N,N,N',N'-(2'-hydroxyethyl)-1,5-pentamethylenediamine tetranitrate separated as a colorless crystalline compound. It was filtered, washed with dry ether and dried over $P_2O_5$ in vacuo. It does not melt sharply, but gradually melts and decomposes, especially at 75–80° C. It is very hygroscopic.

Example 5

Preparation of tetra-N,N,N'-N'-(2-hydroxyethyl)-1,6-hexamethylenediamine tetranitrate:

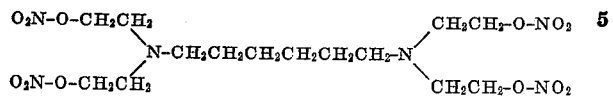

The honey-colored oil resulting from the reaction of 4 mols of ethylene oxide with 1 mol of 1,6-hexamethylenediamine in ice water, followed by subsequent removal of water, as previously described, was nitrated in the manner described in previous examples. The tetranitrate was obtained as a blue gum, which, after neutralizing with cold ammonia water and washing several times with ice water, was finally obtained as a colorless gum, resembling latex. The residual tetranitrate gum was dissolved in methanol and dried as previously described.

To a portion of the methanol solution, $H_3PO_4$ (85%) was added, followed by dry ether until a voluminous precipitate formed. It was filtered, washed with ether and dried in vacuo over $P_2O_5$. The phosphate of tetra-N,N,N',N'-(2'-hydroxyethyl)-1,6-hexamethylenediamine tetranitrate was obtained as fine, colorless crystals, M.P. 53° which are very hygroscopic and soluble in water.

The sulfate (from nitrate+$H_2SO_4$) is obtained in a similar manner in the form of colorless crystals, very soluble in water. It turns yellow at 100° and slowly decomposes as the temperature rises. It charred at 200°. The citrate (from nitrate in methanol by adding citric acid in methanol, followed by dry ether) is colorless. It turns yellow at 105° and melts at 115–118° (decomposed).

It will be understood that modifications and variations may be effected without departing from the spirit and scope of the novel concepts of the present invention.

We claim as our invention:

1. A salt of an acid selected from the group consisting of nitric, phosphoric, sulfuric, hydrochloric, hydrobromic, acetic and citric acids and a compound having the formula:

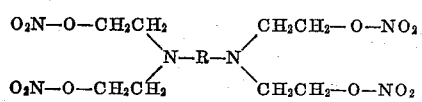

wherein R is a $C_2$–$C_6$ saturated hydrocarbon group selected from the class consisting of aliphatic and cycloaliphatic groups.

2. A salt of an acid selected from the group consisting of nitric, phosphoric, sulfuric, hydrochloric, hydrobromic, acetic and citric acids and a compound having the formula:

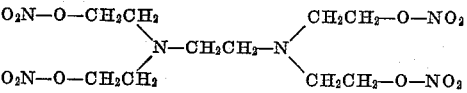

3. The nitrate of a compound having the formula:

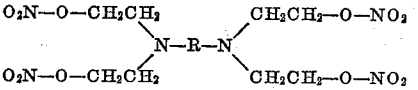

wherein R is a $C_2$–$C_6$ saturated hydrocarbon group selected from the class consisting of aliphatic and cycloaliphatic groups.

4. The nitrate of a compound having the formula:

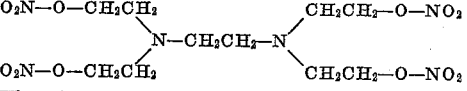

5. The phosphate of a compound having the formula:

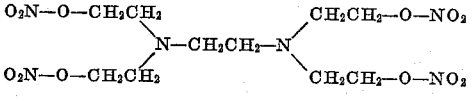

References Cited in the file of this patent
UNITED STATES PATENTS

| | | |
|---|---|---|
| 2,683,165 | Johnson et al. | July 6, 1954 |
| 2,697,118 | Lundsted et al. | Dec. 14, 1954 |
| 2,884,459 | Kirkpatrick et al. | Apr. 28, 1959 |